US009616462B2

(12) United States Patent
Leiden et al.

(10) Patent No.: US 9,616,462 B2
(45) Date of Patent: Apr. 11, 2017

(54) PROTECTIVE POLYMER LAYER

(75) Inventors: Leif Leiden, Andersbole (FI); Jouni Purmonen, Porvoo (FI)

(73) Assignee: Borealis AG, Vienna (AT)

( * ) Notice: Subject to any disclaimer, the term of this patent is extended or adjusted under 35 U.S.C. 154(b) by 183 days.

(21) Appl. No.: 14/239,554

(22) PCT Filed: Jun. 1, 2012

(86) PCT No.: PCT/EP2012/002344
§ 371 (c)(1),
(2), (4) Date: Jun. 23, 2014

(87) PCT Pub. No.: WO2013/037433
PCT Pub. Date: Mar. 21, 2013

(65) Prior Publication Data
US 2014/0312100 A1    Oct. 23, 2014

(30) Foreign Application Priority Data

Sep. 15, 2011 (EP) .................... 11007530

(51) Int. Cl.
| | | |
|---|---|---|
| B05D 7/14 | (2006.01) | |
| F16L 58/10 | (2006.01) | |
| B05D 1/36 | (2006.01) | |
| F16L 58/18 | (2006.01) | |
| F16L 13/02 | (2006.01) | |
| B23K 37/00 | (2006.01) | |
| C23C 28/00 | (2006.01) | |
| B05D 3/10 | (2006.01) | |
| B05D 7/00 | (2006.01) | |
| B05D 1/26 | (2006.01) | |
| B05D 1/38 | (2006.01) | |
| B05D 3/02 | (2006.01) | |

(52) U.S. Cl.
CPC ............ B05D 7/146 (2013.01); B05D 1/36 (2013.01); B05D 7/148 (2013.01); B23K 37/00 (2013.01); C23C 28/00 (2013.01); F16L 13/0272 (2013.01); F16L 58/1054 (2013.01); F16L 58/1072 (2013.01); F16L 58/181 (2013.01); B05D 1/265 (2013.01); B05D 1/38 (2013.01); B05D 3/0209 (2013.01); B05D 3/102 (2013.01); B05D 7/54 (2013.01); B05D 2254/02 (2013.01); B05D 2504/00 (2013.01); B05D 2507/01 (2013.01)

(58) Field of Classification Search
None
See application file for complete search history.

(56) References Cited

U.S. PATENT DOCUMENTS

| | | |
|---|---|---|
| 3,236,917 A | 2/1966 | Natta et al. |
| 4,048,355 A | 9/1977 | Sakayori et al. |
| 4,639,495 A | 1/1987 | Waggoner |
| 4,950,541 A | 8/1990 | Tabor et al. |
| 5,194,509 A | 3/1993 | Hasenbein et al. |
| 5,887,788 A * | 3/1999 | Wakui .................... E01B 3/38 238/117 |
| 2006/0263557 A1 * | 11/2006 | Watson .................. B29C 63/18 428/36.91 |
| 2007/0116910 A1 * | 5/2007 | Polykarpov ............... B32B 7/04 428/35.2 |
| 2010/0133324 A1 * | 6/2010 | Leiden ................ B29C 47/0866 228/176 |

FOREIGN PATENT DOCUMENTS

| | | | |
|---|---|---|---|
| EP | 0 688 794 | 12/1995 | |
| EP | 0 949 274 | 10/1999 | |
| EP | 0 678 103 | 8/2000 | |
| EP | 1 865 037 | 12/2007 | |
| EP | 1 985 909 | 10/2008 | |
| EP | 1 316 598 | 5/2010 | |
| EP | 2 298 455 | 3/2011 | |
| FI | 1316598 A1 * | 6/2003 | ............ C09J 151/06 |
| FI | WO 2011033175 A1 * | 3/2011 | ............... B05D 1/38 |
| FR | 2 252 187 | 6/1975 | |
| WO | WO 90/12657 | 11/1990 | |
| WO | WO 92/12182 | 7/1992 | |
| WO | WO 95/12622 | 5/1995 | |
| WO | WO 96/18662 | 6/1996 | |
| WO | WO 97/28170 | 8/1997 | |
| WO | WO 98/56831 | 12/1998 | |
| WO | WO 98/58001 | 12/1998 | |
| WO | WO 99/65949 | 12/1999 | |
| WO | WO 00/34341 | 6/2000 | |
| WO | WO 00/40620 | 7/2000 | |
| WO | WO 01/32316 | 5/2001 | |
| WO | WO 2008/089978 | 7/2008 | |
| WO | WO 2008/132279 | 11/2008 | |

OTHER PUBLICATIONS

ISO 1183-1:2004, published Feb. 1, 2004.*
International Search Report mailed Aug. 23, 2012 for International Application No. PCT/EP2012/002344.
Written Opinion mailed Aug. 23, 2012 for International Application No. PCT/EP2012/002344.
International Preliminary Report on Patentability mailed Sep. 5, 2012 for International Application No. PCT/EP2012/002344.
* cited by examiner

*Primary Examiner* — Michael P Rodriguez
(74) *Attorney, Agent, or Firm* — Richard M. Klein; Fay Sharpe LLP

(57) ABSTRACT

The present invention relates to a method of joining polymer coated steel pipes comprising the steps of—providing polymer coated pipe segments with an uncoated length on both ends of the segments; —welding the polymer coated pipe segments together; —applying a curable polymer (A) onto the uncoated length of the welded pipe segments to form an first coating layer; and—applying a polymer composition (B) onto the first coating layer to form a topcoat layer with a thickness of 0.5 to 10 mm, wherein the polymer composition (B) has a melt flow rate $MFR_2$ of 1.0 to 6.0 g/10 min, determined according to ISO 1133 at a temperature of 190° C. under a load of 2.16 kg, and includes a base resin comprising (B-1) a non-elastomeric polyethylene in an amount of 60 to 85 wt % of the total polymer composition being produced in a process using a single-site catalyst, and (B-2) an elastomer comprising a copolymer of ethylene and at least one polar comonomer, wherein component (B-1) or components (B-1) and (B-2) have been grafted with an acid grafting agent and the use of polymer composition (B) as topcoat layer with a thickness of 0.5 to 10 mm in a coating of coated steel pipe field-joints, a method of coating a steel pipe and the use of polymer composition (B) for the coating of steel pipe joints or steel pipes.

19 Claims, No Drawings

PROTECTIVE POLYMER LAYER

The application concerns in a first aspect a method of joining polymer coated steel pipes and in a second aspect a method of coating steel pipes. In particular the invention concerns the coating of field joints of steel pipes or the coating of steel pipes with an first coating layer comprising a curable polymer and a topcoat layer comprising an acid-grafted polymer composition comprising a non-elastomeric polyethylene and an elastomer.

Steel pipes are provided with a coating at a pipe factory in order to protect the pipe against mechanical damages and corrosion. A common system for corrosion and mechanical protection is three layer polyolefin coatings. This factory coating usually comprises at least three polymer layers: an epoxy layer applied directly on the outer surface of the steel pipe, an adhesion layer and a top layer of polyethylene or polypropylene.

Polymer coated steel pipes are generally welded together using the SAW technique (Submerged Arc Welding) to form a pipeline. To facilitate weld-joining of the pipes at the construction site, end portions of the pipe may be left without coating at the factory. In practice, the pipes are often coated entirely and in a later stage the polymer layers are stripped or brushed off at the ends of the pipe. This is called cut-back area and the length is defined through the project specification, with the length typically being 150 mm on both pipe ends.

Field-welded joints, i.e. girth welds formed at the construction sites, are sensitive to corrosion as the protective layer on the steel has been stripped off before the welding of the pipes. For this reason, a coating layer has to be spread upon the girth weld and on the adjacent, uncoated portions of the pipes so as to completely cover the welded joint and to shield it from moisture and water at the ambience. Thus, the applied polymer layer also overlaps with the factory coating of the pipes joined.

Field-joint coatings are conventionally most typically produced by injection molding or by surface fused tape techniques. Also a number of other techniques such as epoxy coating, PUR-coating, and coating by vulcanized tapes or shrinkable sleeves have been utilized. WO 2008/132279 discloses a method and apparatus for coating field-welded joints by applying polymer material in form of a melt film or sheet on the surface of the pipe or pipe section from a moving die or nozzle. WO 01/32316 discloses another pipe coating apparatus for coating girth welds of pipelines, which is equipped with spray coating means.

For achieving a durable coating on the pipe, it is essential that the applied polymer layer is strong, internally of high quality and effectively bonded to the steel pipe and onto the factory coating. A vast number of different protective coating solutions (according to field-joint coating standard ISO 21809-3) are considered durable in terms of sufficient protection. Powder epoxy is today used widely either as stand alone or together with a polyolefin coating. In such a case the steel pipe is heated up to desired application temperature normally using inductive heating, and the desired polymers are applied onto the surface. In one common method, the steel pipe is heated to 180-250° C. and powder epoxy is applied, fused and through cured onto the pipe.

A technique involving the combined use of epoxy powder and polyolefin has the potential to provide very durable and tight coatings. However, prior practical implementations of the technique suffer from certain disadvantages. Such an approach is presented in EP 1 316 598, which discloses a method where an adhesive blend composition and a polyethylene outer layer are co-extruded on a through-cured epoxy layer, thus forming a three-layer final structure. This field joint coating structure is similar to the factory coated three layer polyolefin structure and provides good mechanical and corrosion protection. However, such a three-layer structure is much too complicated for coating field-welded joints directly at the construction site.

EP 2 298 455 discloses a method of coating field-welded joints in which a curable first coating layer is utilized and a protective topcoat layer is added thereon while the first coating layer is still in reactive state. Said document does not, however, disclose the composition and the properties of the protective top coat layer.

Thus, there is still a need for method for coating field-joints that is uncomplicated so that it can be conducted at the construction site and at the same time provides a strong and durable coating that effectively protects the field joints from mechanical damages and corrosion.

The present invention is based on the finding that field-joints are effectively coated by applying a polymer composition as topcoat layer onto a partly cured first coating layer that comprises a non-elastomeric polyethylene and an elastomer, wherein at least one of these components is grafted with an acid grafting agent. This coating not only shows a strong adhesion but surprisingly also good mechanical properties.

The first aspect of the present invention therefore provides a method of joining polymer coated steel pipes comprising the steps of providing polymer coated pipe segments with an uncoated length on both ends of the segments;
  welding the polymer coated pipe segments together;
  applying a curable polymer (A) onto the uncoated length of the welded pipe segments to form an first coating layer; and
  applying a polymer composition (B) onto the first coating layer to form a topcoat layer with a thickness of 0.5 to 10 mm,
  wherein the polymer composition (B) has a melt flow rate $MFR_2$ of 1.0 to 6.0 g/10 min, determined according to ISO 1133 at a temperature of 190° C. under a load of 2.16 kg, and includes a base resin comprising
  (B-1) a non-elastomeric polyethylene in an amount of 60 to 85 wt % of the total polymer composition being produced in a process using a single-site catalyst, and
  (B-2) an elastomer comprising a copolymer of ethylene and at least one polar comonomer,
  wherein component (B-1) or components (B-1) and (B-2) have been grafted with an acid grafting agent.

The method according to the invention not only provides a strong adhesion of the coating to the substrate, which can be seen in excellent peel strength, but also good mechanical properties, such as environmental stress crack resistance, Vicat A softening temperature and Shore D hardness, which surprisingly at least meet the requirements of Class A three-layer polyolefin coatings according to ISO 21809-1. Thus, an effective coating of pipe joints can be provided that can be applied very easily so that the coating can be conducted at the construction site and that provides increased protection against corrosion and mechanical damages for a long life time.

As the pipe cools, well-coated welded pipe segments are obtained. It is to be noted that the polymer composition (B) is applied directly onto the first coating layer, without any intermediate layer(s) or adhesives. The polymer composition (B) thereby forms the topcoat of the welded pipe segments so that the total number of polymer layers is two.

Another aspect of the present invention provides a method of coating steel pipes comprising the steps of
applying a curable polymer (A) onto the surface of the steel pipe to form first coating layer; and
applying a polymer composition (B) onto the first coating layer to form a topcoat layer with a thickness of 0.5 to 10 mm,
wherein the polymer composition (B) has a melt flow rate $MFR_2$ of 1.0 to 6.0 g/10 min, determined according to ISO 1133 at a temperature of 190° C. under a load of 2.16 kg, and includes a base resin comprising
(B-1) a non-elastomeric polyethylene in an amount of 60 to 85 wt % of the total polymer composition being produced in a process using a single-site catalyst, and
(B-2) an elastomer comprising a copolymer of ethylene and at least one polar comonomer,
wherein component (B-1) or components (B-1) and (B-2) have been grafted with an acid grafting agent.

The present invention further relates to the use of the above identified polymer composition having a melt flow rate $MFR_2$ of 1.0 to 6.0 g/10 min, determined according to ISO 1133 at a temperature of 190° C. under a load of 2.16 kg, and including a base resin comprising
(B-1) a non-elastomeric polyethylene in an amount of 60 to 85 wt % of the total polymer composition being produced in a process using a single-site catalyst, and
(B-2) an elastomer comprising a copolymer of ethylene and at least one polar comonomer,
wherein component (B-1) or components (B-1) and (B-2) have been grafted with an acid grafting agent, as topcoat layer with a thickness of 0.5 to 10 mm in a coating of steel pipe field-joints or steel pipes.

In the first aspect of the present invention, the first coating layer is preferably partly cured or uncured after the application of the first layer. Such a method offers significant advantages. In addition to forming a mechanically and chemically stable coating for field-joints of three layer polyolefin coated pipes, it makes the application process more straightforward as compared with prior techniques. This is because the first layer is at least partly uncured and thus reactive at the time of application of the polymer composition (B), so that no separate step of applying an adhesive layer between the layers of coating is required. The bonding of the layers takes place through direct polymer-polymer interaction of the layers. The curable polymer (A) is preferably cured completely only after application of the polymer composition (B).

Before welding and coating as a first step polymer coated pipe segments with an uncoated length on both ends need to be provided. The pipe segments are preferably provided with a factory coating, i.e. a three-layer polyolefin coating as known in the art. To facilitate weld-joining of the pipes at the construction site, end portions of the pipe can be left without coating at the factory. In another embodiment, the pipes can be coated entirely and in a later stage the polymer layers are stripped or brushed off at the ends of the pipe. This is called cut-back area. The uncoated length of the pipe segments is defined through the project specification, normally being in the range of 75 to 300 mm, suitably 150 mm on both pipe ends.

The uncoated pipe segments are welded together using a suitable method as known in the art. Preferably welding is conducted using the SAW technique to from a pipeline. Welding is preferably conducted at the construction site.

Before applying the curable polymer (A) the welded pipe segments are preferably treated and cleaned according to a suitable method as known in the art.

Preferably, the curable polymer (A) and the polymer composition (B) are applied onto the uncoated length of the welded pipe segments as such that there is an overlap of the topcoat layer with the previous polymer coating, i.e. the factory coating, of the pipe segments.

In a preferred embodiment for applying the curable polymer (A) the welded pipe segments are preferably heated to a first temperature that is 1 to 20° C. above the melting temperature of the curable polymer (A), and for applying the polymer composition (B) onto the first coating layer to form a topcoat layer the welded pipe segments are preferably heated to a second temperature being higher than the first temperature. This approach has particular advantages. In particular in the case when coating field joints using the polyolefin melt film technique (preferably for the topcoat layer), heat is needed for curing the underlying first coating layer, and for welding of the coating to a factory coating of the pipe. The heat to the steel shall be applied in the process according to this preferred embodiment in two steps, and thus more gently than in prior one-step heating processes, in order to slowly heat up the surface of the factory coating close to its respective melting temperature. Thus, blistering of the factory coating is avoided. Heat from the steel through the factory coating takes time and a heavy one-step heating would cure the curable polymer (A) too soon, i.e. before applying the polymer composition (B). In addition, the heat would not reach the surface of the factory coating for a good welding bond at the bevel of the factory coating and the overlap zone of the coating. A two-step heating, in the first stage heating to the first temperature for applying the curable polymer (A), preferably to a temperature of 110° C. to 170° C., more preferably of 140° C. to 160° C., gives the required time for heat to go through the factory coating as the second heating step to the second temperature for applying the polymer composition (B), preferably to a temperature of 170° C. to 200° C., takes place typically 30 seconds to 30 minutes, in particular 30 seconds to 5 minutes, after the heating to the first temperature. The application procedure of the polymer composition (B) at the second temperature and additional heating cures the curable polymer (A) thoroughly and forms good welding to the factory coating.

In addition, by using the two-step heating process in which the pre-coat and the topcoat are let to react with each other to form a tight bond, also a separate polyolefin powder application can be avoided. This cannot be avoided in a one-step heating as the curable polymer (A) would be through-cured too quickly and no chemical bonds between the pre-coat and the topcoat could form.

One of the main advantages of the invention is that the coating process remains flexible, as the temporal proceeding window is wide. The time between the application of the curable polymer (A) and the polymer composition (B) (ICT=Inter Coating Time) is measured in seconds using conventional coating methods. The embodiment of the present invention allows for pre-heating of the welded pipe segments and application of the curable polymer (A) and then, after a considerably long period, re-heating the pipe segments and partially cured polymer (A) and application of the reactive polyolefin composition (B) on top. Thus, the method is free from inconveniently time critical processing stages.

Preferably the curable polymer (A) comprises an epoxy resin which is applied in powder form or in liquid form.

In a first embodiment the curable polymer (A) is applied onto the heated welded pipe segments in powder form, preferably being an epoxy powder. As the powder contacts the heated pipe segments, it melts and forms a layer onto the surface of the welded pipe segments. The powder can be applied by spraying for example. After layer formation, the polymer (A) is preferably partly cured or even stays uncured. Thereby, it must be ensured that the polymer stays reactive. This means that it is preferably capable of reacting with the polymer composition (B) once applied onto the first coating layer. Provided that the temperature of the pipe segment during application of the powder epoxy is low enough, that is usually less than 160° C., only partial curing takes place and the reactivity of the polymer A stays for at least 30 seconds, typically up to 30 minutes. E.g., the gel time of the epoxy powder is preferably at least 30 seconds. Typically, the gel time is up to 30 minutes, preferably up to 5 minutes. This time frame is sufficiently long for the polymer composition (B) to be applied.

In an alternative embodiment, the curable polymer (A) is applied in liquid form. The curable polymer (A) can be in this case one- or two-component epoxy. In this case, the polymer can be applied onto an unheated or only slightly heated welded pipe segment and its period of reactivity can be prolonged to several hours or even several days. When the pipe segment is heated for applying the topcoat layer, the temperature of first coating layer rises too and the first coating layer forms a reactive underling for the topcoat layer and cures. This embodiment is especially suitable in the case the welding of the pipe segments is conducted not directly at the construction site. Before transporting the welded pipe segments to the construction site the first coating layer is applied, whereas the topcoat layer can then be applied at the construction site.

The first coating layer in all above presented embodiments preferably has a thickness of 0.01 to 0.50 mm, more preferably 0.05 to 0.30 mm, most preferably 0.10 to 0.25 mm.

The polyolefin composition (B) is preferably applied onto the first coating layer in molten form, for example by melt film application technique such as disclosed in WO 2008/132279. Alternatively, the polyolefin composition (B) can be provided in solid form, whereby the heat of the pipe segment melts the polymer composition at least on the interface of the two polymer layers, ensuring that the two polymers react.

In particular, curable epoxy resins as curable polymer (A) have been found, when left in a reactive state, to from an excellent bond with polyolefins that are also reactive as polymer composition (B). The reaction between the layers can be initiated with the additional heating step at the time and/or before application of the topcoat layer.

The terms "reactive (inner coating) layer" and "partial curing (of the first coating layer)" are interlinked in the sense that a partially cured layer is not completely crosslinked and is still reactive within the meaning of the invention. The determination of the degree of crosslinking is based on differential scanning calorimetry (DSC) analysis by which the glass transition temperature Tg of the material can be determined. If Tg deviates by at least 3° C. from a literature value of that polymer (i.e. $\Delta Tg>3°$ C.), the layer is still reactive.

Both curing temperature and curing time influence the degree of crosslinking. The abovementioned condition is generally well met at the gel time (ISO 8130-6) of the epoxy used at the gel time measurement temperature and even longer periods if a lower temperature is used. The significant curing time herein is the time from the application of the curable polymer (A) onto the preferably pre-heated welded pipe segments to the application of the polymer composition (B). The degree of curing is proportional to the time integral over this period of temperature. Thus, as the source of energy for curing is primarily the heat of the pipe segment, the decrease of temperature during this period must be taken into account, if the temperature is not actively maintained at a constant value during this period, as the case usually is. Also, if the temperature of the pipe is elevated again significantly before the application of the polymer composition (B), the increased temperature must be taken into account.

Polymer composition (B) is applied onto the first coating layer to form a topcoat layer having a thickness of 0.5 to 10 mm, preferably 1 to 8 mm, more preferably 2 to 7 mm and most preferably 3 to 6 mm.

The polyethylene of component (B-1) of the polymer composition (B) is preferably a homopolymer of ethylene or a copolymer of ethylene with one or more alpha-olefin comonomer(s). It is also possible that component (B-1) is a mixture of a homo- and a copolymer of ethylene. If an ethylene copolymer forms part of component (B-1), preferably the comonomer(s) comprise(s) alpha-olefins having from 3 to 20 carbon atoms, more preferably from 3 to 12 carbon atoms and most preferably form 4 to 8 carbon atoms.

Examples of the alpha-olefin comonomers include, for example, propylene, 1-butene, 1-pentene, 1-hexene, 4-methyl-1-pentene, 1-octene, 1-decene, styrene and mixtures thereof. Particularly preferred comonomers are 1-butene, 1-hexene, 4-methyl-1-pentene and 1-octene.

The most preferred alpha-olefin comonomers are 1-hexene and 1-octene.

Typically, the amount of comonomer within the copolymer is from 1 to 30 wt % of the total weight of the copolymer and more preferably is from 1 to 5 wt % of the total weight of the copolymer.

In a preferred embodiment component (B-1) is free of long chain branches.

The term "long chain branches" refers to branches produced by polymerisation conditions but not to branches introduced by polymerisable comonomer species.

The term "free of long chained branches" is intended to designate ethylene polymers in which no long chain branching can be detected by using $^{13}C$ nuclear magnetic resonance spectroscopy and using the quantification method as described by Randall, Rev. Macromol. Chem. Phys., $C_{29}$ (2&3), p. 285-297. Due to measurement reasons, only branches with 6 carbon atoms or more are defined as long chain branches.

If a polyethylene is free of long chain branches in the sense of the above paragraph then its contents of long chain branches (lcb) is at least below 0.1 lcb per 1000 carbon atoms.

Such a polyethylene free of long chain branches is preferred due to adhesion properties of the polymer composition.

Component (B-1) of the polymer composition (B) is present in an amount of 60 to 85 wt %, preferably from 70 to 85 wt %, and in particular from 72 to 80 wt %, like from 75 to 80 wt % of the total composition.

Further preferred, component (B-1) of the polymer composition (B) before grafting has a melt flow rate $MFR_2$ of 1 to 10 g/10 min, more preferably of 3 to 8 g/10 min.

$MFR_2$ is measured according to ISO 1133 (Cond. 4) at a temperature of 190° C. under a load of 2.16 kg.

The density of the polyethylene of component (B-1) preferably is from 925 to 945 kg/m³, more preferably from 930 to 940 kg/m³.

Component (B-1) of the polymer composition (B) can be produced in a process comprising any single-site catalyst known in the art.

It is also possible that component (B-1) is produced in a process comprising a mixture of a single-site and another catalyst of the same or different nature. In the case of a mixture of a single-site catalyst and a catalyst of a different nature, it is preferred that at least 90% of component (B-1) of the polymer composition (B) is produced by a single-site catalyst.

Preferably, component (B-1) is produced in a process comprising a metallocene catalyst. Further preferred, the catalyst comprises a metallocene component on a porous support and an alumoxane component.

Preferred catalysts are those as described in EP 0 678 103, WO 97/28170, WO 98/56831 and/or WO 00/34341.

Further preferred, component (B-1) is produced in a process as disclosed in EP 0 678 103 which is characterized in that ethylene is slurry polymerised using a supported olefin polymerisation catalyst prepared by
(1) providing a porous support, which is an inorganic oxide of an element chosen from groups 2 to 4 and 13 to 14 of the Periodic Table of Elements, preferably alumina or silica,
(2) providing a solution comprising (2.1) the reaction product of
(2.1.1) a metallocene of the formula (1)

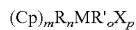

wherein Cp is an unsubstituted or substituted and/or fused homo- or heterocyclopentadienyl, R is a group of 1-4 atoms connecting two Cp rings, M is a transition metal of group 4, 5 or 6 of the Periodic Table of Elements, preferably zirconium or hafnium, R' is a hydrocarbyl or hydrocarboxyl group having 1-20 carbon atoms, and X is a halogen atom, in which case m=1-3, n=0 or 1, o=0-3, p=0-3 and the sum m+n+p=the same as the state of oxidation of M, and
(2.1.2) an alumoxane of the formula (II)

which formula (II) depicts a linear compound, and/or of the formula (III)

(III)

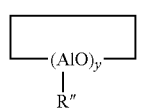

which formula (III) depicts a cyclic compound, and in which formulae (II) and (III) x is 1-40, preferably 10-20, y is 3-40, preferably 3-20, and R" is an alkyl group having 1-20 carbon atoms and
(2.2) a solvent, capable of dissolving said reaction product,
(3) impregnating the porous support with a volume of the solution, which does not exceed the total pore volume of the porous support, and
(4) recovering the impregnated porous support, the pores of which are filled with said solution.

The preferred embodiments of the catalyst given in EP 0 678 103 are also preferred for the production of component (B-1) of the polymer composition (B).

In a further preferred embodiment, component (B-1) is a multimodal polyethylene. Further preferred, the multimodal polyethylene is a bimodal polyethylene.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilizing reactors coupled in series and using different conditions in each reactor, the different polymer fractions produced in the different reactors will each have their own molecular weight distribution which may considerably differ from one another. The molecular weight distribution curve of the resulting final polymer can be looked at as the Superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182, WO 96/18662, WO 98/58001, WO 99/65949 and WO 2008/089978.

The multimodal polyethylene preferably is produced in a multi-stage process in a multi-step reaction sequence such as described in WO 92/12182. In this process, in a first step ethylene is polymerized in a loop reactor in the liquid phase of an inert low-boiling hydrocarbon medium. Then, the reaction mixture after polymerisation is discharged from the loop reactor and at least a substantial part of the inert hydrocarbon is separated from the polymer. The polymer is then transferred in a second or further step to one or more gas-phase reactors where the polymerization is continued in the presence of gaseous ethylene. The multimodal polymer produced according to this process has a superior homogeneity with respect to the distribution of the different polymer fractions which cannot be obtained e.g. by a polymer mix.

The catalyst for the production of the non-elastomeric polyethylene (B-1) comprises a single-site catalyst, such as e.g. a metallocene catalyst. Preferred single-site catalysts are described in EP 688 794, EP 949 274, WO 95/12622, WO 00/34341 and WO 00/40620. Most preferred is the catalyst as described in WO 95/12622 and its preferred embodiments as described in this document.

The multimodal polyethylene comprises a low molecular weight (LMW) ethylene homo- or copolymer fraction and a high molecular weight (HMW) ethylene homo- or copolymer fraction.

Depending on whether the multimodal ethylene polymer is bimodal or has a higher modality, the LMW and/or HMW fraction may comprise only one fraction each or two or more subfractions. The expression "ethylene homopolymer" as used herein refers to a polyethylene that consists substantially, i.e. to at least 99% by weight, preferably at least 99.5% by weight and more preferably at least 99.9 by weight of ethylene. Especially preferably it consists of ethylene units.

Preferably, the ethylene polymer is a bimodal polymer consisting of one LMW fraction and one HMW fraction.

It is further preferred that the ethylene polymer comprises an ethylene polymer fraction selected from
(a) a LMW ethylene polymer having a density of 860-970 kg/m³, more preferably from about 900-950 kg/m³, and an MFR$_2$ of 10-5000 g/10 min, more preferably of 25-300 g/10 min, and
(b) a HMW polymer having a density of 870-945 kg/m³, more preferably of 870-940 kg/m³ and an MFR$_2$ of 0.01-5.0 g/10 min, more preferably of 0.1-3 g/10 min.

Thus, the low molecular weight ethylene polymer preferably is a high density type polyethylene (HDPE) and the high molecular weight ethylene polymer is a linear low density type polyethylene (LLDPE). Preferably, the ethylene polymer comprises both fractions (a) and (b).

At least one fraction of the ethylene polymer preferably is a copolymer which was polymerized with a $C_4$-$C_8$ alpha-olefin, preferably with at least one comonomer selected from the group consisting of 1-butene, 4-methyl-1-pentene, 1-hexene and 1-octene, most preferably 1-hexene. Preferably, the amount of comonomer in the ethylene polymer is 0.02-5.0 mol %, more preferably 0.05-2.0 mol %.

Preferably, the HMW fraction is an ethylene copolymer, preferably copolymerized with one of the above-cited comonomers. Further preferred, the LMW fraction of the polyethylene is a homopolymer.

Further, it is preferred that if the polyethylene (B-1) is produced according to the above-described multi-stage process the LMW fraction is produced in the loop reactor and the HMW fraction in the gas-phase reactor.

The properties of the multimodal polyethylene can be adjusted by the ratio of the low molecular fraction and the high molecular fraction in the multimodal polyethylene.

Preferably, the ethylene polymer comprises 35-55 wt %, preferably 43-51 wt % and most preferred 44-50 wt % of a low molecular weight ethylene polymer component, and 65-45 wt %, preferably 57-49 wt % and most preferred 56-50 wt % of a high molecular weight ethylene polymer component.

Component (B-1) of polymer composition (B) preferably has a molecular weight distribution Mw/Mn of 1.0 to 5.0, more preferably 1.0 to 4.0, most preferably 1.5 to 3.5.

The polymer composition (B) has a $MFR_2$ value of the final composition (after grafting) of 1.0 to 6.0 g/10 min, more preferably 1.5 to 5.5 g/10 min, and most preferably 2.0 to 5.0 g/10 min.

The density of the base resin of polymer composition (B), preferably after grafting, preferably is from 925 to 950 kg/m$^3$, more preferably from 930 to 945 kg/m$^3$ and most preferably from 930 to 940 kg/m$^3$.

"Base resin" thereby denotes the amount of polymer components of the polymer composition (B) without any non-polymeric additives.

As acid grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic or non-metallic). Preferably, the unsaturated group is in conjugation with the carboxylic group.

Examples of such grafting agents include acrylic acid, methacrylic acid, fumaric acid, maleic acid, nadic acid, citraconic acid, itaconic acid, crotonic acid, and their anhydrides, metal salts, esters amides or imides.

The preferred grafting agents are maleic acid its derivatives such as maleic anhydride, and in particular maleic anhydride.

Grafting can be carried out by any process known in the art such as grafting in an melt without a solvent or in solution or dispersion or in a fluidised bed. Preferably, grafting is performed in a heated extruder or mixer as e.g. described in U.S. Pat. No. 3,236,917, U.S. Pat. No. 4,639,495, U.S. Pat. No. 4,950,541 or U.S. Pat. No. 5,194,509. Preferably, grafting is carried out in a twin screw extruder such as described in U.S. Pat. No. 4,950,541.

Grafting may be carried out in the presence or absence of a radical initiator but is preferably carried out in the presence of a radical initiator such as an organic peroxide, organic perester or organic hydroperoxide.

The amount of said acid grafting agent added to the overall composition before grafting is preferably from 0.01 to 3.0 parts by weight, more preferably from 0.03 to 1.5 parts by weight of the overall composition.

Grafting may be applied either to component (B-1) or to the blend of components (B-1) and (B-2). Preferably, grafting is applied to the blend of components (B-1) and (B-2).

In the polymer composition (B) component (B-2) is an elastomeric ethylene copolymer with one or more polar comonomer(s). The polar comonomer(s) are preferably selected from alkylacrylates, alkylmethacrylates and alkylacetates Preferred examples of such elastomers are ethylene-alkylacrylates, ethylene-alkylmethacrylates and ethylene-alkylacetates. Further preferred, the comonomer is having a polar moiety of the formula

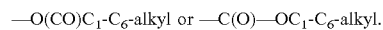

Particularly preferred elastomers are ethylenevinylacetate (EVA), ethylenemethylacrylate (EMA), ethylenemethylmethacrylate (EMMA), ethylenepropylacrylate and ethylenebutylacrylate (EBA), in particular EBA.

The amount of polar comonomer(s) in component (B-2) is preferably in the range of 1 to 40 wt %, more preferably 3 to 35 wt %, most preferably 5 to 30 wt %.

Component (B-2) may additionally comprise at least one comonomer being an alpha-olefin selected from the group of propylene, 1-butene, 1-pentene, 1-hexene, 1-octene, 4-methyl-1-pentene, 1,4-butadiene and 1,4-hexadiene.

The elastomer of component (B-2) may be made by any process known in the art also including processes comprising a single-site catalyst.

Preferably, component (B-2) is present in the polymer composition (B) in an amount of 15 to 40 wt %, more preferably 15 to 30 wt %, and most preferably 20 to 28 wt %, such as 20 to 25 wt %.

The adhesive polymer composition comprises components (B-1) and (B-2) as described above. In a preferred embodiment the base resin of polymer composition (B) consists of the non-elastomeric polyethylene (B-1) and the elastomer of component (B-2).

In addition to these components, conventional additives may also be present in the composition in small amounts preferably up to at most 4 wt %. For example, an antioxidant may be present in the composition in an amount of at most 10,000 ppm, more preferably at most 5,000 ppm and most preferably at most 3,000 ppm.

The polymer composition (B) preferably further comprises at least one pigment selected from carbon black, azo-dyes and titanium dioxide. Carbon blacks are available from a number of suppliers, for instance, from Cabot and Evonik. Other suitable pigments are azo-dyes such as PY 94 (3,3'-[(2,5-dichloro-1,4-phenylene)-bis-[imino-(1-acetyl-2-oxo-2,1-ethanediyl)-azo]]-bis-[4-chloro-N-(5-chloro-2-methylphenyl)-benzamide].), PY 95 (3,3'-[(2,5-dimethyl-1,4-phenylene)-bis-[imino-(1-acetyl-2-oxo-2,1-ethanediyl)-azo]]-bis-[4-chloro-N-(5-chloro-2-methylphenyl)-benzamide].) and PY 93. Titanium dioxide is also available from a number of suppliers, like Cristal Global, DuPont and Kronos The at least one pigment is preferably present in the polymer composition (B) in an amount of 0.01 to 5 wt %, more preferably 0.1 to 3 wt %, most preferably 0.5 to 2.5 wt %.

The at least one pigment can be added to the polymer composition as a master batch where the pigment(s) and optionally other additives have been incorporated into a polymer carrier resin, preferably a polyolefin resin. In the master batch the at least one pigment is preferably present in an amount of 1 to 25 wt %, more preferably 5 to 20 wt %. Thereby, the polymer carrier resin is preferably not counted to the base resin of polymer composition (B).

It is preferred that the polymer composition (B) apart from the conventional additives and the at least one pigment consists of components (B-1) and (B-2), i.e. that no further polymer components before or after grafting are added.

Conventional additives may be added before or after grafting. The additives include antioxidants, process stabilizers and other additives known in the art.

The polymer composition (B) preferably has a melting temperature of 110° C. to 130° C., more preferably 115° C. to 125° C.

The coating applied to the welded pipe segments by means of the method according to the invention shows strong adhesion to the substrate and also good mechanical properties. Additionally, the top coat has an even thickness throughout the periphery of the pipe. Furthermore, when the composition according to the present invention is used as the top coat a smooth coating without formation of cracks is obtained.

It is thereby preferred that the coating applied to the uncoated length of the welded pipe segments has a peel strength of at least of at least 250 N/cm, more preferably at least 300 N/cm, and most preferably at least 350 N/cm, determined according to EN ISO 21809-1 at a temperature of 23° C. The upper limit of the peel strength is usually 800 N/cm.

Further, the topcoat layer applied to the uncoated length of the welded pipe segments preferably has an environmental stress crack resistance ESCR (F20) of more than 2,000 h, more preferably of more than 3,000 h and most preferably of more than 4,000 h, determined according to ASTM D 1693-A in 10% Igepal. The measurement of ESCR is usually stopped after 10,000 h without breaking at latest.

Still further, the topcoat layer applied to the uncoated length of the welded pipe segments preferably has Vicat A softening point of more than 95° C., more preferably of more than 98° C., most preferably of more than 101° C., determined according to ISO 306. The upper limit of the Vicat A softening point of the topcoat layer is usually 125° C., preferably 120° C., most preferably 110° C.

Additionally, the topcoat layer applied to the uncoated length of the welded pipe segments preferably has a Shore D hardness of more than 45, more preferably more than 47, most preferably more than 49 determined according to ASTM D 2240. The upper limit of the Shore D hardness is usually 75, preferably 60, most preferably 55.

The second aspect of the present invention is related to a method of coating steel pipes comprising the steps of
  applying a curable polymer (A) onto the surface of the steel pipe to form first coating layer; and
  applying a polymer composition (B) onto the first coating layer to form a topcoat layer with a thickness of 0.5 to 10 mm,
  wherein the polymer composition (B) has a melt flow rate $MFR_2$ of 1.0 to 6.0 g/10 min, determined according to ISO 1133 at a temperature of 190° C. under a load of 2.16 kg, and includes a base resin comprising
  (B-1) a non-elastomeric polyethylene in an amount of 60 to 85 wt % of the total polymer composition being produced in a process using a single-site catalyst, and
  (B-2) an elastomer comprising a copolymer of ethylene and at least one polar comonomer,
  wherein component (B-1) or components (B-1) and (B-2) have been grafted with an acid grafting agent.

It is to be noted that the polymer composition (B) is applied directly onto the first coating layer, without any intermediate layer(s) or adhesives. The polymer composition (B) thereby forms the topcoat of the steel pipe so that the total number of polymer layers on the steel pipe is two.

Thereby, the curable polymer (A) and the polymer composition (B) preferably relate to all embodiments of as described above.

Further, the first coating layer and the topcoat layer preferably relate to all embodiments of first coating layer and the topcoat layer as described above.

It is preferable to properly prepare the surface of the steel pipe before coating. The pipe surface is typically inspected for any rust, dirt, flaws, discontinuities, and metal defects. All the excess material needs to be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

For applying the first coating layer the pipes are typically heated with induction heating up to a temperature of preferably about 190° C. to 200° C. The temperature is adjustable depending on the line speed and the curable polymer (A) being used in the first coating layer. The temperature decreases slightly during the coating process.

If epoxy powder (at 23° C.) is used as curable polymer (A) it is typically sprayed on with epoxy guns, where the speed of the rotating line is about 8 m/min. The thickness of the epoxy or other types of curable polymer (A) are set in accordance with end use specified requirements. Normal thickness value for the first coating layer is from 70 to 200 μm, such as 135 μm.

The topcoat layer is preferably applied on the first coating layer by extrusion. The extrusion of the topcoat layer may be performed, for instance, with a single screw extruder. The extruder may have a diameter of, for instance, from 30 to 100 mm, such as 60 mm, and a length of from 15 to 50 L/D, such as 30 L/D. The temperature is typically controlled in several zones. The temperature of the topcoat layer after the die is preferably from 190 to 300° C., such as 225 and 250° C., respectively. Die widths are preferably from 50 to 300 mm, such as 110 mm and 240 mm. The topcoat layer is usually rolled tightly onto the pipe with a silicone pressure roller. The thickness of the topcoat layer is typically from 1 to 8 mm, more preferably from 2 to 7 mm and most preferably from 3 to 6 mm.

After the coating the coated pipe is cooled, for instance by providing water flow on the coated pipe surface.

Surprisingly for a two layer coating not only shows good adhesion properties but also good mechanical properties good mechanical properties, such as environmental stress crack resistance, Vicat A softening temperature and Shore D hardness. Preferably, the coating of the steel pipe according to the method of the invention preferably shows the same mechanical properties as the coating of the field joints as described above.

The present invention further relates to the use of a polymer composition having a melt flow rate $MFR_2$ of 1.0 to 6.0 g/10 min, determined according to ISO 1133 at a temperature of 190° C. under a load of 2.16 kg, and including a base resin comprising
(B-1) a non-elastomeric polyethylene in an amount of 60 to 85 wt % of the total polymer composition being produced in a process using a single-site catalyst, and
(B-2) an elastomer comprising a copolymer of ethylene and at least one polar comonomer, wherein component (B-1) or components (B-1) and (B-2) have been grafted with an acid grafting agent, as topcoat layer with a thickness of 0.5 to 10 mm in a coating on steel pipe field-joints.

Thereby, the polymer composition preferably relates to polyolefin composition (B) according to all embodiments described above.

The coating and the welding of the coated steel pipe field joints and the coating of the steel pipes is preferably conducted according to all embodiments of the methods as described above.

In the following, the present invention is further illustrated by means of examples.

1. METHODS a) Density

Density of the polymer was measured according to ISO 1183-1:2004 Method A on compression moulded specimen prepared according to EN ISO 1872-2 (February 2007) and is given in kg/m$^3$.

b) Melt Flow Rate

The melt flow rate (MFR) is determined according to ISO 1133 and is indicated in g/10 min. The MFR is an indication of the melt viscosity of the polymer. The MFR$_2$ for polyethylene was determined at 190° C. under a load of 2.16 kg.

c) Peel Strength

Adhesion of polymer on steel was tested by Instron 1122 peel strength test equipment according to EN-ISO 21809-1 (DIN 30670). The test was conducted at a temperature of 23° C.: A strip of 3 cm width is cut of the coating layer. The other end of the strip is fastened to pulling equipment and the pulling strength is measured during the peeling of the strip from the steel with a pulling speed of 10 mm/min. The results are expressed as N per cm.

d) Shore Hardness

Shore D hardness was determined according to ISO 868-2003. Test specimens 10×10 mm were milled out of a compression moulded sheet of thickness 4 mm. the compression moulding was done at molding temperature of 200° C. Material was pre-heated by applying light contact pressure for 10 min. Then full pressure was applied for 1 minute, after which material was cooled with a cooling rate of 15° C./min. Demolding temperature was 40° C.

e) Vicat a Softening Point

The Vicat A test was conducted according to ISO 306 method A50 using a load of 10 N and a heating rate of 50° C./h. Test specimens 10×10 mm were milled out of a compression moulded sheet of thickness 4 mm. the compression moulding was done at molding temperature of 200° C. Material was pre-heated by applying light contact pressure for 10 min. Then full pressure was applied for 1 minute, after which material was cooled with a cooling rate of 15° C./min. Demolding temperature was 40° C.

f) Environmental Stress Crack Resistance

ESCR was conducted according to ASTM D 1693 (50° C., 10% Igepal CO630).

Test specimens according to ASTM D 1693 condition A were prepared through compression molding of sheets of thickness 1.85 mm. Compression molding was done according to ISO 1872-2 at molding temperature of 200° C. Material was pre-heated by applying light contact pressure for 10 min. Then full pressure was applied for 1 minute, after which material was cooled with a cooling rate of 15° C./min. Demolding temperature was 40° C. The specimens (38.6±2.5 mm×13±0.8 mm) were cut out of the sheets, and notched according to ASTM D 1693 Table 1, condition A g) Melting Temperature

The Melting Temperature ($T_m$) is measured with Mettler TA820 differential scanning calorimeter (DSC) on 3±0.5 mg samples. The melting curves were obtained during 10° C./min cooling and heating scans between −10-200° C. Melting temperatures were taken as the peaks of endotherms.

h) GPC

The weight average molecular weight Mw and the molecular weight distribution (MWD=Mw/Mn wherein Mn is the number average molecular weight and Mw is the weight average molecular weight) is measured by a method based on ISO 16014-4:2003 and ASTM D 6474-99. A Waters GPCV2000 instrument, equipped with refractive index detector and online viscosimeter was used with 2×GMHXL-HT and 1×G7000H columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with 15 narrow MWD polystyrene (PS) standards in the range of 1 kg/mol to 12 000 kg/mol. Mark Houwink constants were used for polystyrene and polyethylene (K: 19×10$^{-3}$ mL/g and a: 0.655 for PS, and K: 39×10$^{-3}$ mL/g and a: 0.725 for PE). All samples were prepared by dissolving 0.5-3.5 mg of polymer in 4 mL (at 140° C.) of stabilized TCB (same as mobile phase) and keeping for max. 3 hours at 160° C. with continuous shaking prior sampling in into the GPC instrument.

2. EXAMPLES a) Preparation of Polymer Composition (B)

Polymer Composition (B)-Inventive (B-Inv)

A medium density polyethylene was produced using a single-site catalyst prepared according to example 1 of WO 95/12622. The polymerisation was carried out in a slurry loop reactor. The temperature in the reactor was 85 to 100° C. Isobutane was used as a diluent and the pressure in the slurry loop reactor was approximately 40 bar. 1-hexene was used as a comonomer and the feed ratio was 4.8 to 5.2 kg comonomer/100 kg ethylene. The incorporation of 1-hexene was around 3.3 to 3.5% of the total weight in the medium density polyethylene. Small amounts of hydrogen were used to control the MFR (0.33-0.37 Nm$^3$/ton ethylene) with almost 100% conversion.

The adhesive blend compositions in the following examples were grafted in Werner & Pfleiderer ZSK 32-mm co-rotating, twin-screw, extruder.

The single-site medium-density polyethylene, characterised of no long chain branches, has a density of 934 kg/m$^3$ and an MFR$_2$ value of 6 g/10 min. The M$_w$/M$_n$ value of the single-site medium-density polyethylene is about 2. The ethylene butyl acrylate elastomer, having a butyl acrylate content of 27% by weight a density of 926 kg/m$^3$ and an MFR$_2$ value of 4 g/10 min, was added.

The blend composition was grafted in Werner & Pfleiderer ZSK 32-mm co-rotating, twin-screw, extruder.

In the extruder 74.99 wt % single-site medium-density polyethylene, 23.5 wt % ethylene butyl acrylate elastomer, 1 wt % of a pigment masterbatch containing 75.95% by weight polyethylene with a MFR$_2$ of 2.2 g/10 min and a density of 920 kg/m$^3$, 1.25% by weight Chromophthal yellow GRP (pigment Y95), distributed by BASF Pigments EU, 8.65% by weight Versal Yellow 6G (pigment Y94), distributed by Synthesia, 4.0% by weight of Tiona 188, distributed by Quimicoplasticos, or Tioxide R-FC, distributed by Huntsman, 10% by weight Chimassorb 119 FL and 0.15% by weight Irganox 1076 FD, both distributed by Ciba Specialty Chemical, now BASF SE are added. 0.4 wt % of antioxidant Irganox B 225, distributed by Ciba Specialty Chemical, now BASF SE, was added as stabiliser and the graft was achieved by adding 0.1 wt % of maleic anhydride. 0.01 wt % peroxide initiator (Perkadox 14S-fl, distributed by Akzo Nobel) was dissolved in isododecane. The temperature in the extruder was varied between 170 and 210° C. and the screw speed was set at 200 rpm. The resulting grafted blend composition had a MFR$_2$ value of 4.6 g/10 min.

Polymer Composition (B)-Comparative (B-Comp)

Polymer composition (B-comp) was produced similar to polymer composition (B-inv) except that the composition did not contain an ethylene butyl acrylate elastomer.

In the extruder 98.49 wt % single-site medium-density polyethylene, 1 wt % pigment masterbatch, 0.4 wt % of antioxidant Irganox B 225, 0.1 wt % of maleic anhydride, and 0.01 wt % peroxide initiator dissolved in isododecane were compounded. The resulting grafted blend composition had a MFR$_2$ value of 5.0 g/10 min b) Preparation of HDPE Composition A high density polyethylene resin was polymerized according to example 1 of EP 1 865 037. As polymerization catalyst the Ziegler-Natta catalyst produced according to example 3 of EP 0 688 794 A has been used. The resin was compounded with 0.4 wt % of antioxidant Irganox B 225 (distributed by Ciba Specialty Chemical, now BASF SE) and 2.25 wt % carbon black.

c) Pipe Coating

Coating 1

The ends of two steel pipe segments with a diameter of 114 mm were cleaned to remove the excess material from the surface in the area to be welded. The segments were then welded together. The uncoated area was then heated to 110° C. Epoxy powder (Infralit EP/PE 8087-18) was then sprayed onto the pipe surface so that the thickness of the epoxy layer was 135 μm. Then the pipe was heated to 180° C. and the polymer composition (B-inv) as prepared above was extruded onto the epoxy layer by using the equipment described in paragraphs [0072] to [0076] of EP 2 181 832. The temperature of the melt was about 230° C. The topcoat layer had a thickness of about 4.5 mm. The thus obtained coating is referred to as Coating 1 below. The coating was smooth and free of cracks.

Coating 2

Coating 2 was produced as a three-layer coating comprising the epoxy, an adhesion layer and the HDPE composition as described above as top coat as described in paragraph [0037] of EP 1 865 037. The epoxy primer layer had a thickness of about 100 μm, the adhesive layer had a thickness of about 250 μm and the HDPE layer had a thickness of about 3.2 mm. The thus obtained coating is referred to as Coating 2 below. The coating was smooth and free of cracks. While such a three-layer coating gives good properties its application, in field conditions is not applicable and it is thus suitable as factory coating only.

Coating 3

Coating 3 was produced in a similar manner as Coating 1 but in place of polymer composition (B-inv) the polymer composition (B-comp) was used. When the coating was inspected, cracks were observed in the coating. Therefore it was not feasible to analyze the coating further.

Coating 4

Coating 4 was produced as in a similar manner Coating 1 but instead of Composition (B-inv) the HDPE composition as described above was used. Because of the absence of the adhesion layer the coating did not adhere to the epoxy layer and no coating was obtained.

d) Properties of the Coatings

Table 1 discloses the properties of the coating according to the method of the invention (Coating 1) using the polymer composition (B-inv) of example (a) and the three layer HDPE coating (Coating 2) according to the state of the art using the high density polyethylene composition of example (b). It can be seen that surprisingly the coating according to the invention (Coating A) shows not only excellent peel strength but that also polymer composition (B-inv) shows sufficient mechanical strength to meet the requirements of Class A three-layer polyolefin coatings according to ISO 21809-1. In regard of ESCR and peel strength even the requirements of Class B three-layer polyolefin coatings according to ISO 21809-1 are met.

TABLE 1

|  | Coating 1 | Coating 2 | ISO 21809-1 Class B | ISO 21809-1 Class A |
|---|---|---|---|---|
| MFR$_2$ [g/10 min] | 4.6 | 0.48 | | |
| Melting temperature [° C.] | 121 | 128 | | |
| Vicat A [° C.] | 104 | 120 | >110 | >95 |
| Shore D | 49.8 | 60 | >55 | >45 |
| ESCR [h] | >5000 | >5000 | >1000 | >300 |
| Peel strength [N/cm] | 370 | >500 | >150 | >100 |

The invention claimed is:

1. A method of joining polymer coated steel pipes comprising the steps of
   providing polymer coated pipe segments with an uncoated length on both ends of the segments;
   welding the polymer coated pipe segments together;
   applying a curable polymer (A) onto the uncoated length of the welded pipe segments to form a first coating layer; and
   applying a polymer composition (B) directly onto the first coating layer without any intermediate layers or adhesives, to form a topcoat layer with a thickness of 0.5 to 10 mm,
   wherein the polymer composition (B) has a melt flow rate MFR$_2$ of 1.0 to 6.0 g/10 min, determined according to ISO 1133 at a temperature of 190° C. under a load of 2.16 kg, and includes a base resin comprising (B-1) a non-elastomeric polyethylene in an amount of 60 to 85 wt % of the total polymer composition being produced in a process using a single-site catalyst, and (B-2) an elastomer comprising a copolymer of ethylene and at least one polar comonomer, wherein component (B-1) or components (B-1) and (B-2) have been grafted with an acid grafting agent, and wherein the total number of polymer layers applied onto the welded pipe segments is two, consisting of the first coating layer and the topcoat layer.

2. The method according to claim 1, comprising the additional step of partly curing the curable polymer (A) or leaving the curable polymer (A) uncured at or after applying the curable polymer (A).

3. The method according to claim 2, wherein for applying the curable polymer (A) the welded pipe segments are heated to a first temperature being 1 to 20° C. above the melting temperature of the curable polymer (A) and for applying the polymer composition (B) onto the first coating layer to form a topcoat layer the welded pipe segments are heated to a second temperature being higher than the first temperature.

4. The method according to claim 1, wherein the curable polymer (A) comprises an epoxy resin which is applied in powder form or in liquid form.

5. The method according to claim 1, wherein the composition (B) comprises from 72 to 80 wt % of component (B-1) and from 20 to 28 wt % of component (B-2).

6. The method according to claim 1, wherein the first coating layer has a thickness of 0.01 to 0.5 mm.

7. The method according to claim 1, wherein the polymer composition (B) further comprises a pigment in an amount of 0.01 to 5 wt % wherein the pigment is selected from carbon black, azo-dyes, and titanium dioxide.

8. The method according to claim 1, wherein the non-elastomeric polyethylene (B-1) has a density of 925 kg/m$^3$ to 945 kg/m$^3$, determined according to ISO 1183.

9. The method according to claim 1, wherein the non-elastomeric polyethylene (B-1) is a copolymer of ethylene and at least one alpha-olefin comonomer with 3 to 20 carbon atoms.

10. The method according to claim 1, wherein the at least one polar comonomer in elastomer (B-2) is selected from alkylacrylates, alkylmethacrylates, and alkyl acetates.

11. The method according to claim 1, wherein the acid grafting agent is selected from unsaturated carboxylic acids and derivatives thereof such as anhydrides, esters and metallic and non-metallic salts.

12. The method according to claim 1, wherein the first coating layer and the topcoat layer define a coating; and wherein the coating applied to the uncoated length of the welded pipe segments has a peel strength of at least 250 N/cm, determined according to EN ISO 21809-1 at a temperature of 23° C.

13. The method according to claim 1, wherein the topcoat layer has an environmental stress crack resistance ESCR (F20) of more than 2000 h, determined according to ASTM D 1693-A in 10% Igepal.

14. The method according to claim 1, wherein the topcoat layer has Vicat A softening point of more than 95° C., determined according to ISO 306.

15. The method according to claim 1, wherein the topcoat layer has a Shore D hardness of more than 45, determined according to ASTM D 2240.

16. A method of coating steel pipes comprising the steps of applying a curable polymer (A) onto the surface of the steel pipe to form a first coating layer; and applying a polymer composition (B) directly onto the first coating layer without any intermediate layers or adhesives, to form a topcoat layer with a thickness of 0.5 to 10 mm, wherein the polymer composition (B) has a melt flow rate MFR$_2$ of 1.0 to 6.0 g/10 min, determined according to ISO 1133 at a temperature of 190° C. under a load of 2.16 kg, and includes a base resin comprising (B-1) a non-elastomeric polyethylene in an amount of 60 to 85 wt % of the total polymer composition being produced in a process using a single-site catalyst, and (B-2) an elastomer comprising a copolymer of ethylene and at least one polar comonomer, wherein component (B-1) or components (B-1) and (B-2) have been grafted with an acid grafting agent, and wherein the total number of polymer layers applied onto the welded pipe segments is two, consisting of the first coating layer and the topcoat layer.

17. A method for coating steel pipe field-joints or steel pipes comprising the step of providing a polymer composition having a melt flow rate MFR$_2$ of 1.0 to 6.0 g/10 min, determined according to ISO 1133 at a temperature of 190° C. under a load of 2.16 kg, and including a base resin comprising (B-1) a non-elastomeric polyethylene in an amount of 60 to 85 wt % of the total polymer composition being produced in a process using a single-site catalyst, and (B-2) an elastomer comprising a copolymer of ethylene and at least one polar comonomer, wherein component (B-1) or components (B-1) and (B-2) have been grafted with an acid grafting agent, as a topcoat layer with a thickness of 0.5 to 10 mm, and wherein the topcoat layer is applied directly onto a first coating layer without any intermediate layers or adhesives, so that the total number of polymer layers applied onto the steel pipe field-joints or steel pipes is two.

18. The method according to claim 1, wherein the pipe segments are heated to a first temperature of 110° C. to 170° C. to cure polymer (A), and heated to a second temperature of 170° C. to 200° C. to cure polymer composition (B).

19. The method according to claim 7, wherein the pigment is present in an amount of greater than 3 wt %.

* * * * *